United States Patent [19]

Penta

[11] Patent Number: 4,705,470

[45] Date of Patent: Nov. 10, 1987

[54] CHEESE HANDLING APPARATUS

[76] Inventor: Angelo D. Penta, 29 Timberlea Trail, Kirkland, Quebec, Canada, H9J 2Y3

[21] Appl. No.: 706,466

[22] Filed: Feb. 27, 1985

[51] Int. Cl.⁴ .......................... A23P 1/10; B29C 33/34; B29C 39/34; B29C 43/58

[52] U.S. Cl. ........................................ 425/148; 53/122; 53/253; 53/502; 53/527; 99/460; 99/461; 99/466; 99/484; 141/80; 141/83; 141/256; 141/283; 177/120; 177/145; 198/504; 198/505; 425/261; 425/361

[58] Field of Search ................. 99/452, 460, 461, 484, 99/485; 141/80, 83, 256, 283; 425/148, 261, 361; 177/119, 120, 145; 198/504, 505; 53/502, 527, 249, 253, 122

[56] References Cited

U.S. PATENT DOCUMENTS

| | | | |
|---|---|---|---|
| 3,664,084 | 5/1972 | Meckley | 53/253 |
| 3,805,689 | 4/1974 | Berger et al. | 141/80 |
| 4,075,086 | 2/1978 | Marsh et al. | 198/480.1 |
| 4,388,795 | 6/1983 | Stohlquist et al. | 53/282 |

Primary Examiner—Willard E. Hoag
Attorney, Agent, or Firm—Samuel Meerkreebs

[57] ABSTRACT

A portable apparatus for handling cheese, including a base and a turntable mounted on the base. The turntable has cutout recesses in the periphery thereof for moving molds in a circular locus. A platform is provided on the base for supporting the molds as they are being moved in a circular locus. The base includes stations. A filling and weighing station is provided on the base whereby curd is filled into the molds and weighed to a predetermined level. A compacting station is also provided on the base whereby the curd in the molds will be pressed to remove the air therefrom and packs the cheese within the molds. The recesses and the turntable are in registry with the stations on the base.

5 Claims, 3 Drawing Figures

CHEESE HANDLING APPARATUS

BACKGROUND OF THE INVENTION

1. Field of the Invention

The present invention relates to an apparatus for handling cheese, and particularly to an apparatus for filling, weighing, and compacting curd into individual molds.

2. Description of the Prior Art

Heretofore, the operation of filling the curd into molds or hoops in the cheese making process was done by hand. Traditionally, the mold is placed on a roller conveyor below a screw conveyor and is filled with the curd from the screw conveyor to an approximate weight which is guessed at visually by the operator and then moved on the conveyor to a weighing scale. From the weighing scale, the operator then moves the mold to a compacting station where a pneumatic press is actuated to compress the curd within the mold and remove the air from the curd.

SUMMARY OF THE INVENTION

It is an aim of the present invention to provide an apparatus which can do all three operations automatically.

A construction in accordance with the present invention comprises a base, a turntable mounted on said base, means for driving the turntable relative to said base, the turntable having a plurality of mold seats, the mold seats in the turntable being in registry with a station on the base, the stations on the base including a mold receiving station, a filling and weighing station, a compacting station, and an unloading station. The mold seats on the turntable are in registry with the stations, equally spaced apart peripherally about the turntable. Drive means are provided for driving the turntable intermittently while advancing the molds from one station to the other in a sequence from the mold receiving station to the mold delivery station.

In a more specific embodiment, the turntable is in the form of a plate with recesses cut out peripherally of the plate. Rail means are provided on the base and extend in the circular locus of the mold when the mold is moved by the turntable, such that the mold slides on the rail means.

BRIEF DESCRIPTION OF THE DRAWINGS

Having thus generally described the nature of the invention, reference will now be made to the accompanying drawings, showing by way of illustration, a preferred embodiment thereof, and in which:

FIG. 3 is a vertical cross-section taken through line 3—3 of FIG. 2.

DESCRIPTION OF THE PREFERRED EMBODIMENTS

Figure 1:
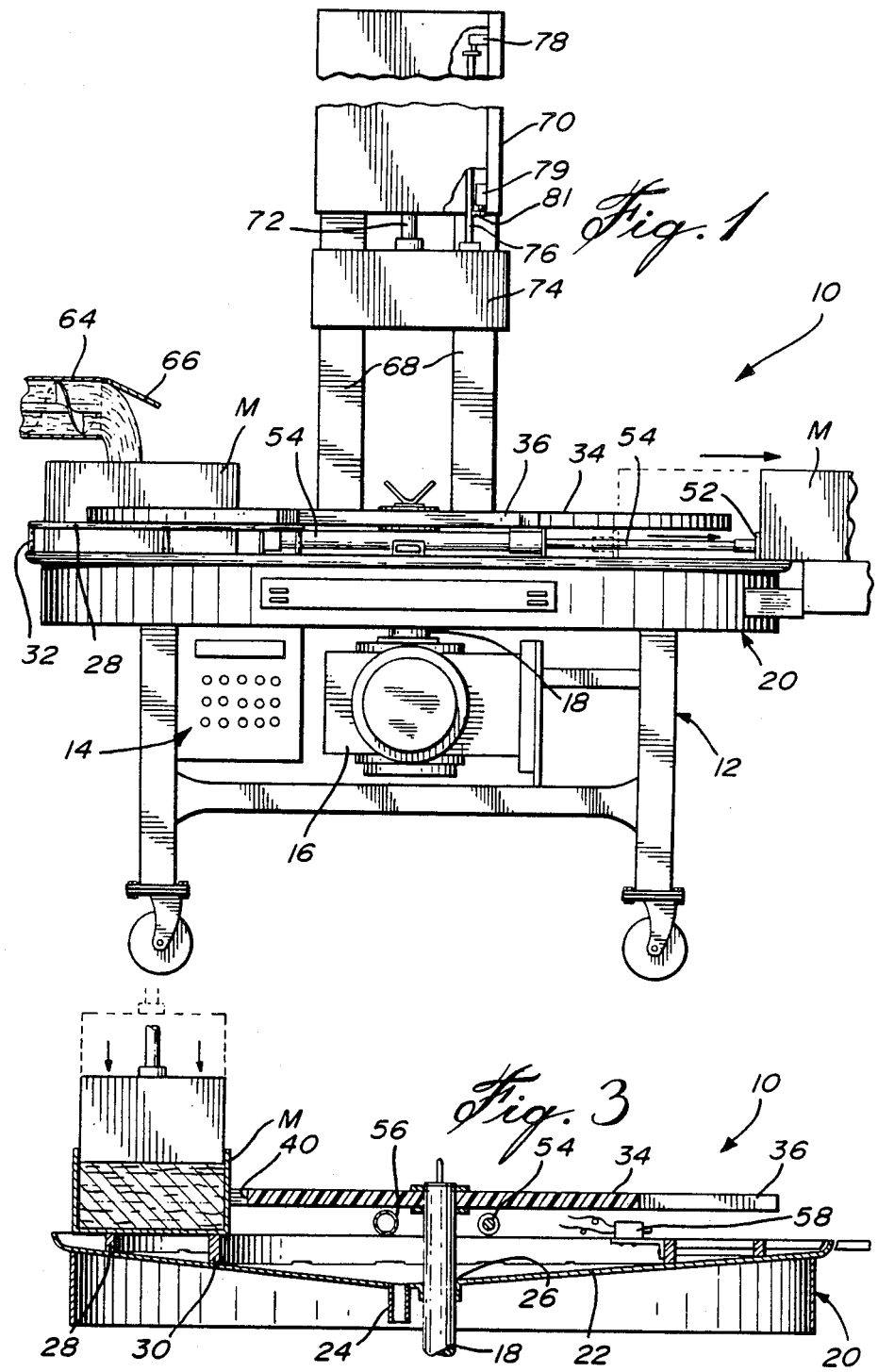
FIG. 1 is a front elevation of an apparatus for handling cheese as defined in the present invention.

Referring now to the drawings, the apparatus is illustrated as a portable unit 10 comprising a frame 12 mounted on wheels. A control panel 14 is mounted on the frame 12, as is a direct drive motor 16 to which is engaged a vertical shaft 18. The panel 14 includes a programmable microprocessor programmed to meet the customer's needs. The frame 12 mounts a platform 20 having a centrally sloping drainage surface 22 and a drainage tube 24. The purpose of the surface 22 is to collect whey which might spill from the hoops or molds M while being handled on the portable unit 10.

A pair of circular rails 28 and 30 mounted on supports 32 to the platform 20 are provided for supporting the mold M and allowing the mold to slide thereon while it is being moved. A turntable 34 is mounted at the top end of the shaft 18. The turntable 34 is provided with cutout recesses 36, 38, 40 and 42 on the periphery thereof. Each of the recesses is spaced apart at 90° from each other.

Figure 2:
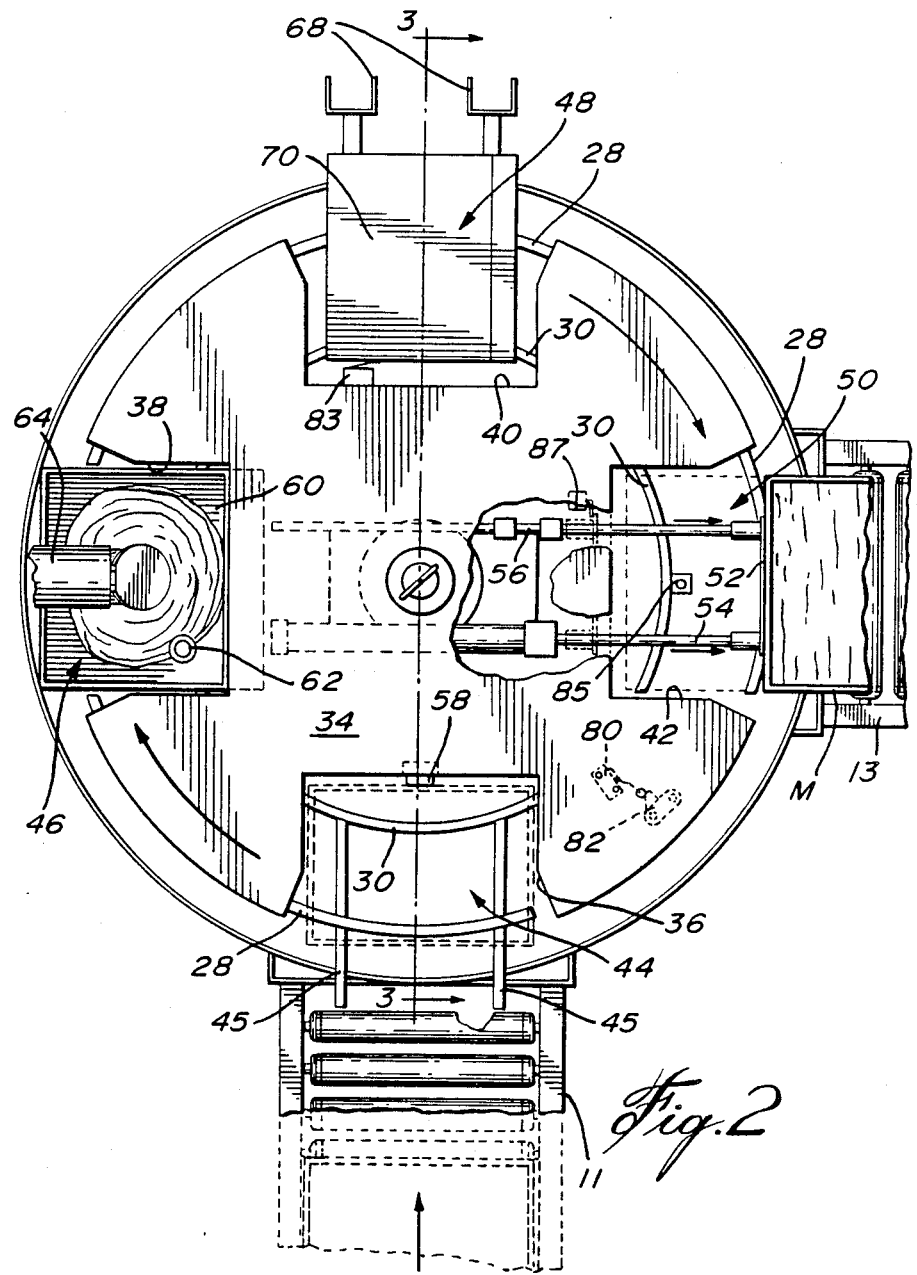
FIG. 2 is a top plan view thereof.

The platform 20 is provided with a series of stations which are distributed on the platform at 90° to each other to correspond with the recesses in the turntable 34. A receiving station 44, for instance, is provided on the platform and includes outwardly extending rails 45. A proximity switch 58 is also provided at the receiving station 44. In a starting position, the recess 36 in the turntable 34 coincides with the receiving station 44, as shown in FIG. 2.

Successively in a clockwise direction, the next station is the filling station 46. The filling station 46 is provided with a weight scale 60 and a proximity switch 62 thereon. The filling of the mold M on the scale 60 is provided by a conventional screw conveyor 64 outside of the portable unit 10 which advances the cheese from the cheese table. However, as will be described later, the screw conveyor 64 is operatively controlled from the control panel 14 of the portable unit 10. The screw conveyor 64 is also provided with a pivoting flap 66, which is activated to close once a predetermined weight of cheese has been sensed by the scale 60, in order to block the feed of curd into the mold M.

The next station is the compacting station 48. A proximity switch 83 is provided in the station 48 to announce the arrival of the mold M. Station 48 includes a press frame 68 mounting a housing 70 in which is provided a pneumatic cylinder (not shown) from which extends a piston 72 mounting a press head 74. The press head 74 has an outside outline which corresponds to the inner shape of the opening of the mold M. A rod 76 is provided on the press head 74 which is adapted to activate a proximity switch 78 in the housing 70 when the press head is in an upper position. Likewise, a proximity switch 79 is provided to be activated by a finger 81 on the guide rod 76 to stop the downward descent of the press head 74.

The final station is the unloading station 50. Station 50 includes a pusher 52 movable by means of a pneumatic piston and cylinder arrangement 54 and 56 located under the turntable 34 straddling the shaft 18. The pusher 52 is operable to move the mold from the recess 42, for instance, onto a waiting conveyor 13. A proximity switch 85 is provided at the station 50 to announce the arrival of the mold M. A proximity switch 87 is also provided near the guide slide rod 56 to announce the full return of the pusher 52.

The turntable 34 must be properly indexed so that the recesses 36, etc., always arrive exactly coinciding with the respective stations 44, etc. In order to accomplish this, a proximity switch 80 is provided between stations 44 and 50 and is mounted on the platform 20. A gate 82 is mounted to the underside of the turntable 34 and is adapted to engage the proximity switch 80. Gates 82 are provided between each station and, in fact, stop the movement of the turntable 34 for each quarter cycle, thereby ensuring registry of the recesses to the station at each operation.

In operation, the portable unit 10 would be moved to a suitable curd filling conveyor 64 and a mold feeding conveyor 11. The mold conveyor 11 could be motorized or could be a roller conveyor as shown in the drawings, on which the molds M would be moved to the portable unit 10.

The control panel 14 includes a programmed computer and relays which will not be described herein as the design of the program for the computer can be varied depending on the operations required, and such design would be provided by one skilled in the art.

For purposes of describing the operation, a single mold M will be described as it passes through the various sequences.

The mold M, therefore, is moved on the conveyor 11 onto the receiving station 44 until it is snug within the recess 36 of the turntable 34 and sitting on the rails 28 and 30, thus activating the proximity switch 58 which signals the computer in the control panel to begin a sequence. However, the computer is programmed not to begin a sequence until the operations in the other stations have been completed, including, for instance, the screw conveyor 64 having been stopped and the gate 66 closed as well as the press head 74 of the compacting station 48 being in its uppermost position, with the rod 76 engaging the proximity switch 78. Thus, the computer will provide a signal to the direct drive motor 16 to rotate the shaft 18 and thus the turntable 34 clockwise through 90°.

However, the motor will not stop until a gate 82 between succeeding recesses of the turntable 34 has come into contact with the proximity switch 80. The clockwise rotation of the turntable 34 will have moved the mold M on the rails 28 and 30 to the station 46 onto the scale 60. When mold M is on the scale 60, it will activate the proximity switch 62 provided on the scale 60 which will signal the computer to weigh the mold empty. The scale is then set at 0 by the computer. A signal will then be given to the drive of the screw conveyor 64 to advance curd past the pivoting gate 66 into the mold M. When the portable unit 10 is placed in position relative to the feed conveyor 64, the conveyor drive will be connected electronically by a suitable lead to the control panel 14 and, in particular, to the computer. The curd will be fed into the mold M until a predetermined weight of curd has been received within the mold. Once the weight scale has reached the predetermined programmed weight, the computer will signal the drive of the feed conveyor 64 to stop and will also activate the means (not shown) to close the pivoting gate 66. The screw conveyor 64 may be a twostage speed screw conveyor whereby the initial filling will be at a higher speed, and as the predetermined weight of curd has been received within the mold M, the speed of the screw conveyor will fall into the second lower speed until an accurate curd mass has been accumulated in the mold.

When the predetermined weight of curd has been received in the mold M. The computer will have received the signal that the mold is ready to move to the next station 48.

When the mold M is glided on the rails 28 and 30 to the station 48, the press head 74 will be activated by a further proximity switch 49 provided in the filling station 48 to move downwardly into the mold M. The press head 74 will remain in its lowermost position in the mold M for a predetermined period of time. The purpose of the compacting by the press head 74 is to remove air from the curd in the mold and to compact the cheese in the mold M to allow a cover to be placed on the mold M. Once the time delay has expired, the piston 72 will be reactivated to lift the press head 74 to its uppermost position, whereby the rod 76 will engage the proximity switch 78, thus advising the computer that the press head 74 is in its uppermost position and that the compacting station 48 is in ready. It is, of course, noted that as the mold M is following in recess 36 through the various sequences, molds are also at the respective stations in the respective recesses 38, 40 and 42.

The mold M is now moved by the turntable 34 into the station 50. The pusher 52 will be automatically activated, when the turntable stops, by means of the proximity switch 80, to push the mold M out of the recess onto the conveyor 13. The pusher is moved by the extension of pistons 54 and 56. The pusher 52 is immediately retracted by the piston and cylinder arrangement 54 and 56 below the turntable 34 to be clear of the rails 28 and 30 and prepared to receive the next mold in the unloading station. Thus, the mold M is then clear of the turntable 34. Once the pusher 52 has been retracted and the switch 87 activated, the recess 36 is then moved to the receiving station 44, and the cycle is prepared to be repeated.

It is estimated that the automatic operations will provide the filling and unloading of four molds of 40 lbs. per minute. Bypass switches are also provided to provide manual override of the control panel, for instance, when a series of fillings is being terminated, and it may be necessary to bypass certain readiness signals in order to complete the final molds, such as the compacting of the last mold when no mold is sitting on the scale.

Thus, the turntable can be operated, and various operations can be made without depending on the complete automated cycle.

I claim:

1. An apparatus for handling cheese comprising a frame including a platform, a turntable mounted on said frame above said platform, means for driving the turntable relative to the platform, the turntable having a plurality of mold recesses, the mold recesses of the turntable being registerable with stations on the platform, the stations on the platform including in sequence a mold receiving station, a filling and weighing station, a compacting station, and an unloading station, the mold recesses on the turntable registerable with the stations being equally spaced-apart, cut-outs on the periphery about the turntable, the platform includes mold runner means enabling the mold to slide thereon with the minimum of friction, the weighing station including scale means on the platform associated with the runner means for weighing mold at the filling and weighing station, the drive means being adapted to drive the turntable intermitently while advancing the mold recesses and thus the molds over the runner means on the platform from one station to the other in sequence from the mold receiving station to the mold unloading station.

2. An apparatus as define in claim 1, wherein the mold filling and weighing station includes a weight scale, on the platform means for determining the weight of the empty molds before filling, means for filling the mold with curd, and means for halting the curd feeding means when a predetermined weight of curd has been deposited in the mold.

3. An apparatus as defined in claim 2, wherein the compacting station includes a pressing head adapted to move in a vertical axis, the pressing head operatively mounted to a press housing, the pressing head adapted to press down into the mold on the platform to shape the curd within the mold by removing the air therefrom.

4. An apparatus as defined in claim 1, wherein the turntable is in the form of a circular plate mounted on a vertical drive shaft on the platform and the runner means consists of rail means mounted on the platform for supporting the molds in a circular locus in the mold recesses as the turntable rotates.

5. An apparatus as defined in claim 4, wherein the unloading station includes pusher means mounted on a piston and cylinder arrangement mounted on the frame adapted to push the molds from the rails on the platform away from the respective cutout forming the mold recess.

* * * * *